(12) United States Patent
Taschereau

(10) Patent No.: US 11,548,430 B2
(45) Date of Patent: Jan. 10, 2023

(54) CARGO STRAP ROLLING ASSEMBLY

(71) Applicant: Denis Taschereau, New Durham, NH (US)

(72) Inventor: Denis Taschereau, New Durham, NH (US)

( * ) Notice: Subject to any disclaimer, the term of this patent is extended or adjusted under 35 U.S.C. 154(b) by 575 days.

(21) Appl. No.: 16/731,308

(22) Filed: Dec. 31, 2019

(65) Prior Publication Data

US 2021/0197705 A1 Jul. 1, 2021

(51) Int. Cl.
*B65H 18/10* (2006.01)
*B60P 7/08* (2006.01)
*B65H 18/08* (2006.01)

(52) U.S. Cl.
CPC .......... *B60P 7/0846* (2013.01); *B65H 18/085* (2013.01); *B65H 18/10* (2013.01)

(58) Field of Classification Search
CPC ..... B65H 18/10; B65H 18/085; B60P 7/0846; B60P 7/0823
See application file for complete search history.

(56) References Cited

U.S. PATENT DOCUMENTS

| | | | | |
|---|---|---|---|---|
| 4,266,740 A * | 5/1981 | Ramos | ................... | B65H 18/10 242/537 |
| 4,390,141 A * | 6/1983 | Webster | ................ | B60P 7/0846 242/395 |
| 5,033,690 A * | 7/1991 | McIver | ................ | B65H 54/585 242/615.3 |
| 5,961,191 A | 10/1999 | Taylor | | |
| 6,290,440 B1 | 9/2001 | DiViccaro | | |
| D489,246 S | 5/2004 | Boliea | | |
| 7,878,330 B2 | 2/2011 | Dewolf | | |
| 8,074,795 B2 | 12/2011 | Neu | | |
| 9,856,075 B2 | 1/2018 | Breeden | | |
| 10,000,148 B1 * | 6/2018 | Haynes | ................. | B60P 7/0846 |
| 2015/0107066 A1 * | 4/2015 | Lu | ......................... | B60P 7/0846 24/69 ST |
| 2016/0339830 A1 * | 11/2016 | McLemore | .......... | B65H 54/585 |
| 2017/0022020 A1 * | 1/2017 | Evans | .................. | B65H 54/585 |
| 2020/0377003 A1 * | 12/2020 | Egigian | ................ | B60P 7/0846 |

FOREIGN PATENT DOCUMENTS

WO WO2016201442 12/2016

* cited by examiner

*Primary Examiner* — Sang K Kim

(57) ABSTRACT

A cargo strap rolling assembly for wrapping a cargo strap into a roll for storage includes a grip that includes a handle, a guide and a shaft. A first disk is slidable onto the shaft and a peg is coupled to the first disk. An end of the cargo strap can be wrapped around the peg when the cargo strap is passed through the guide. A second disk engages the peg such that the first disk is rotatably coupled to the second disk. A barrel is slidable onto the shaft and the barrel releasably engages the second disk such that the barrel is rotatably coupled to the second disk. A crank is removably attachable to the barrel for rotating the barrel around the shaft. In this way the cargo strap is wrapped around the barrel to form a roll for storage.

15 Claims, 6 Drawing Sheets

CARGO STRAP ROLLING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to rolling devices and more particularly pertains to a new rolling device for rolling up a cargo strap for storage.

(2) Description of Related Art Including Information Disclosed Under 37 CFR 1.97 and 1.98

The prior art relates to rolling devices. The prior art discloses a picnic caddy that includes a plurality of shafts and apertures for slidably receiving the shafts. The prior art discloses a cargo strap storage device that includes a spindle for storing a cargo strap in a roll. Additionally, the prior art discloses a portable caddy that includes shafts and apertures for receiving the shafts. The prior art discloses a cargo strap storage device for suspending a plurality of cargo straps oriented in a row. The prior art also discloses a cargo strap storage case that has a plurality of compartments of sufficient shape and dimension for storing a rolled up cargo strap. The prior art discloses a storage bin that has a winder integrated therein for winding cargo straps into a roll for storage in the storage bin.

BRIEF SUMMARY OF THE INVENTION

An embodiment of the disclosure meets the needs presented above by generally comprising a grip that includes a handle, a guide and a shaft. A first disk is slidable onto the shaft and a peg is coupled to the first disk. An end of the cargo strap can be wrapped around the peg when the cargo strap is passed through the guide. A second disk engages the peg such that the first disk is rotatably coupled to the second disk. A barrel is slidable onto the shaft and the barrel releasably engages the second disk such that the barrel is rotatably coupled to the second disk. A crank is removably attachable to the barrel for rotating the barrel around the shaft. In this way the cargo strap is wrapped around the barrel to form a roll for storage.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
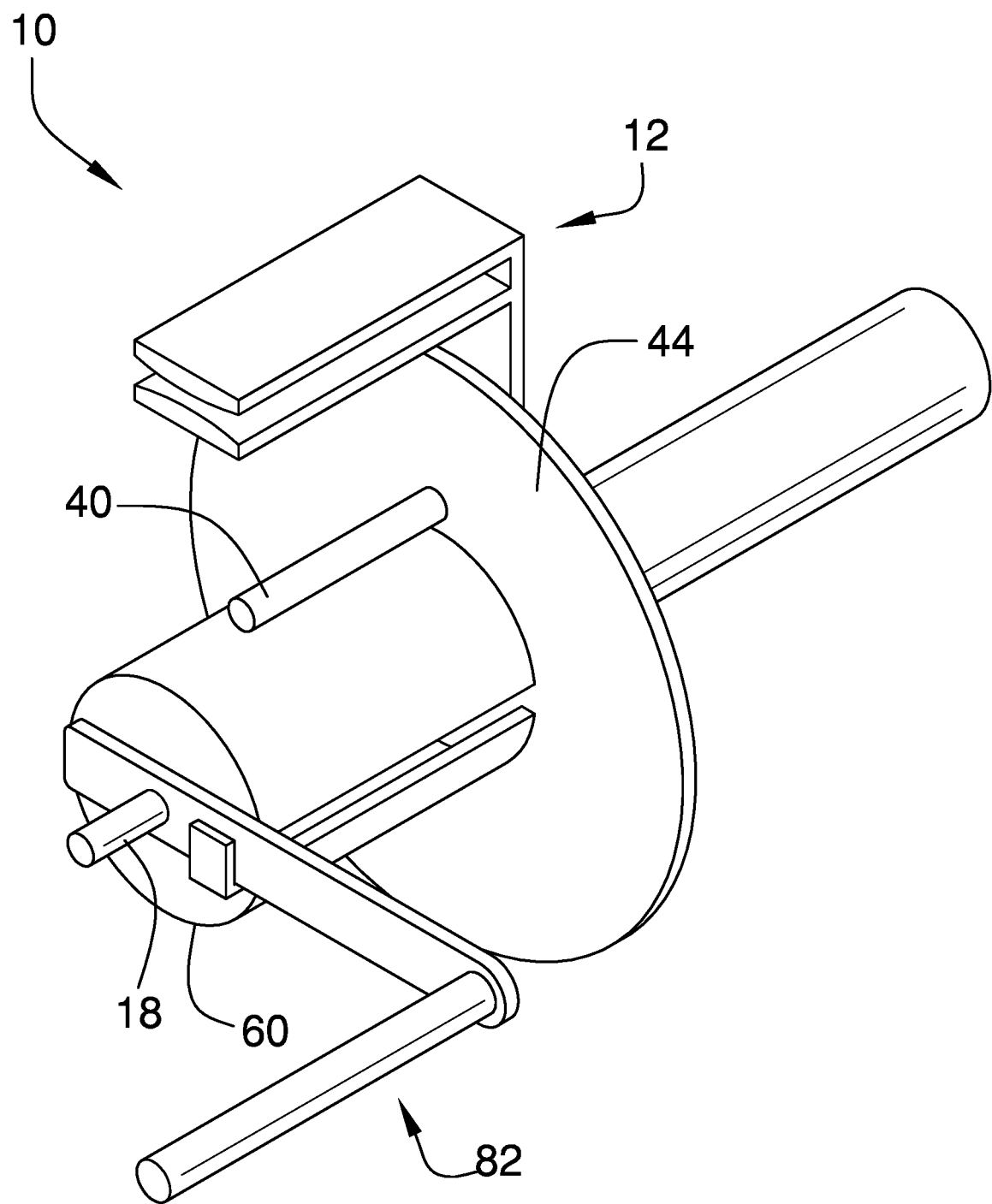
FIG. 1 is a perspective view of a cargo strap rolling assembly according to an embodiment of the disclosure.
Figure 2:
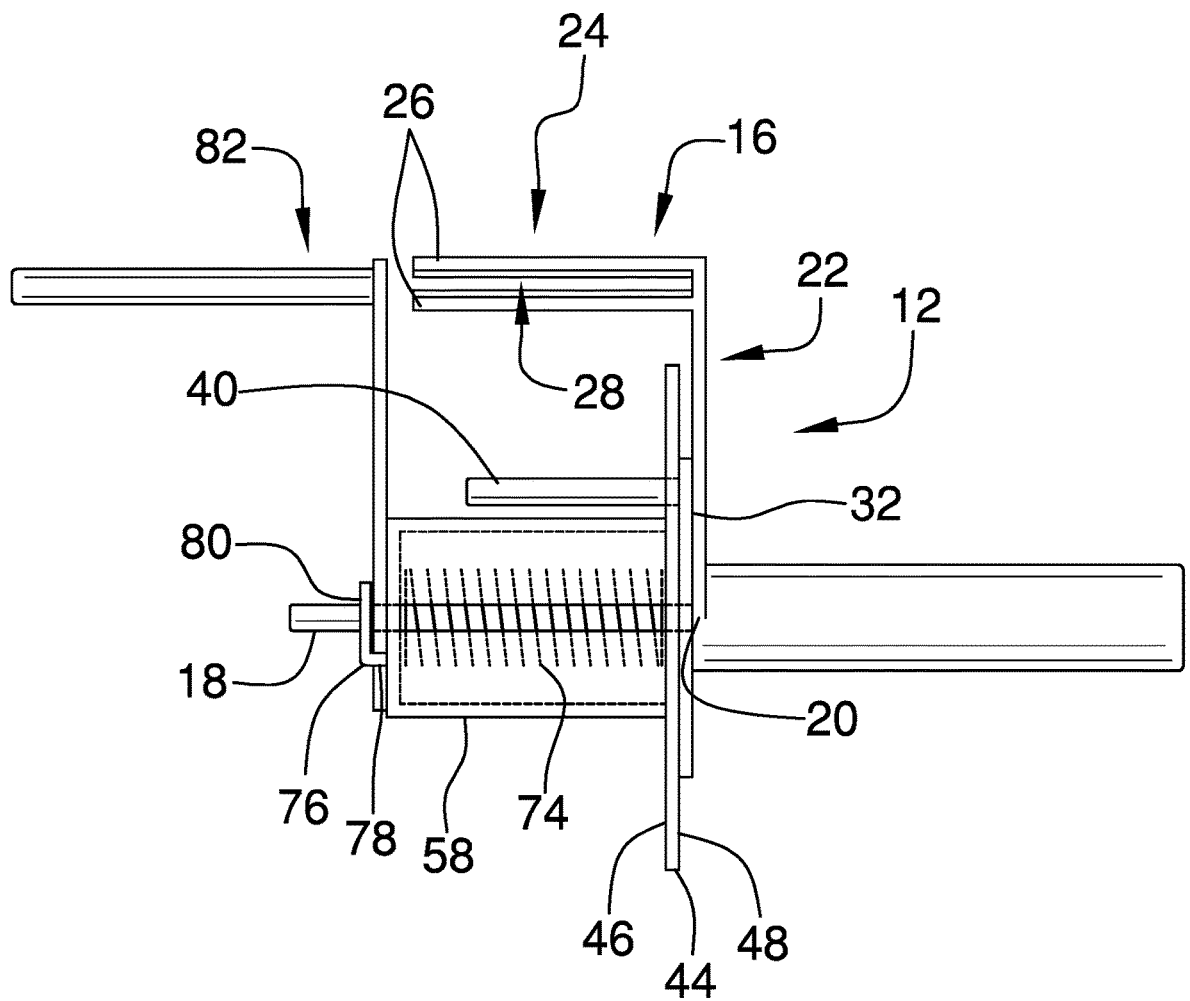
FIG. 2 is a left side phantom view of an embodiment of the disclosure.
Figure 3:
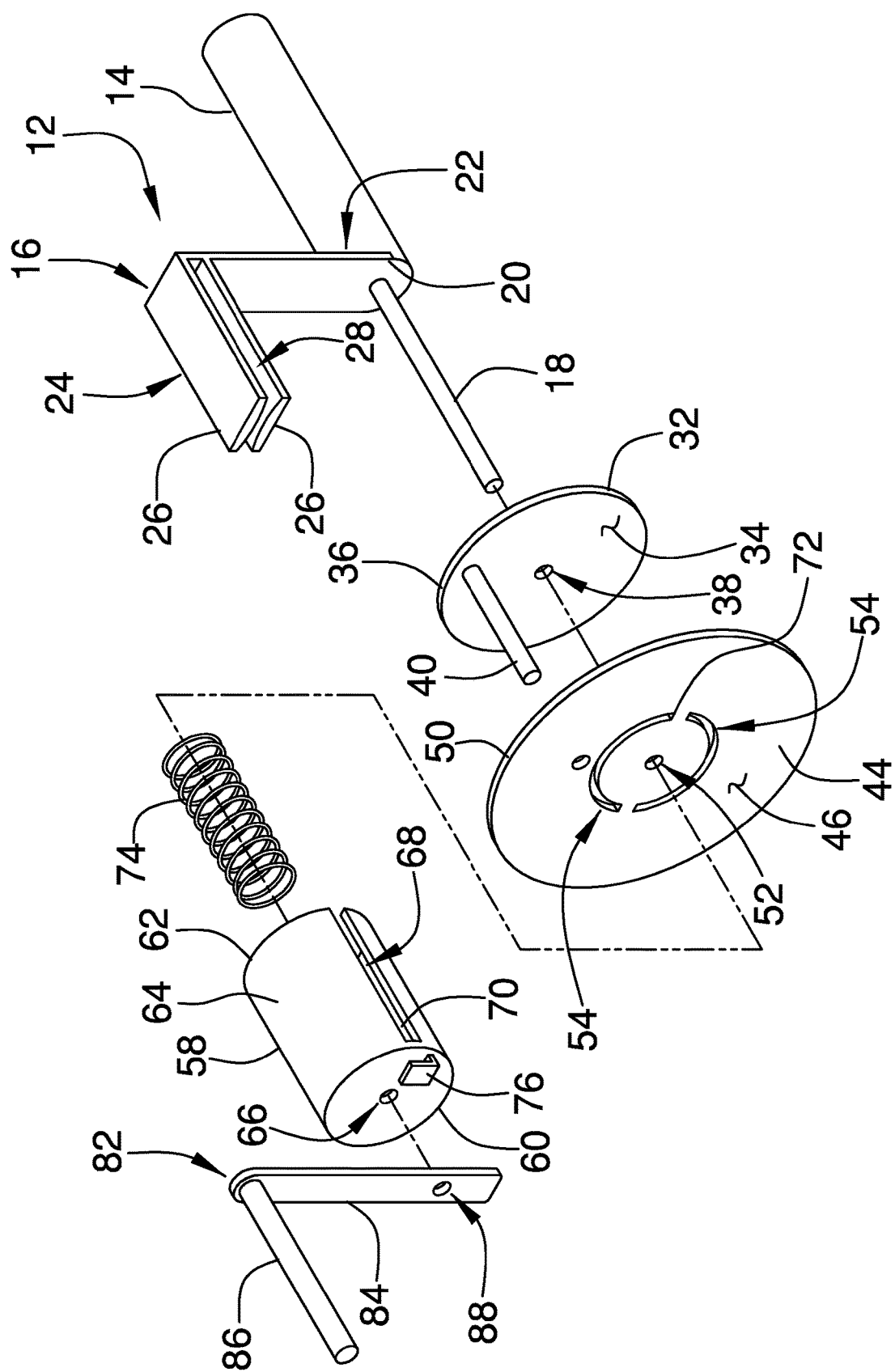
FIG. 3 is an exploded perspective view of an embodiment of the disclosure.
Figure 4:
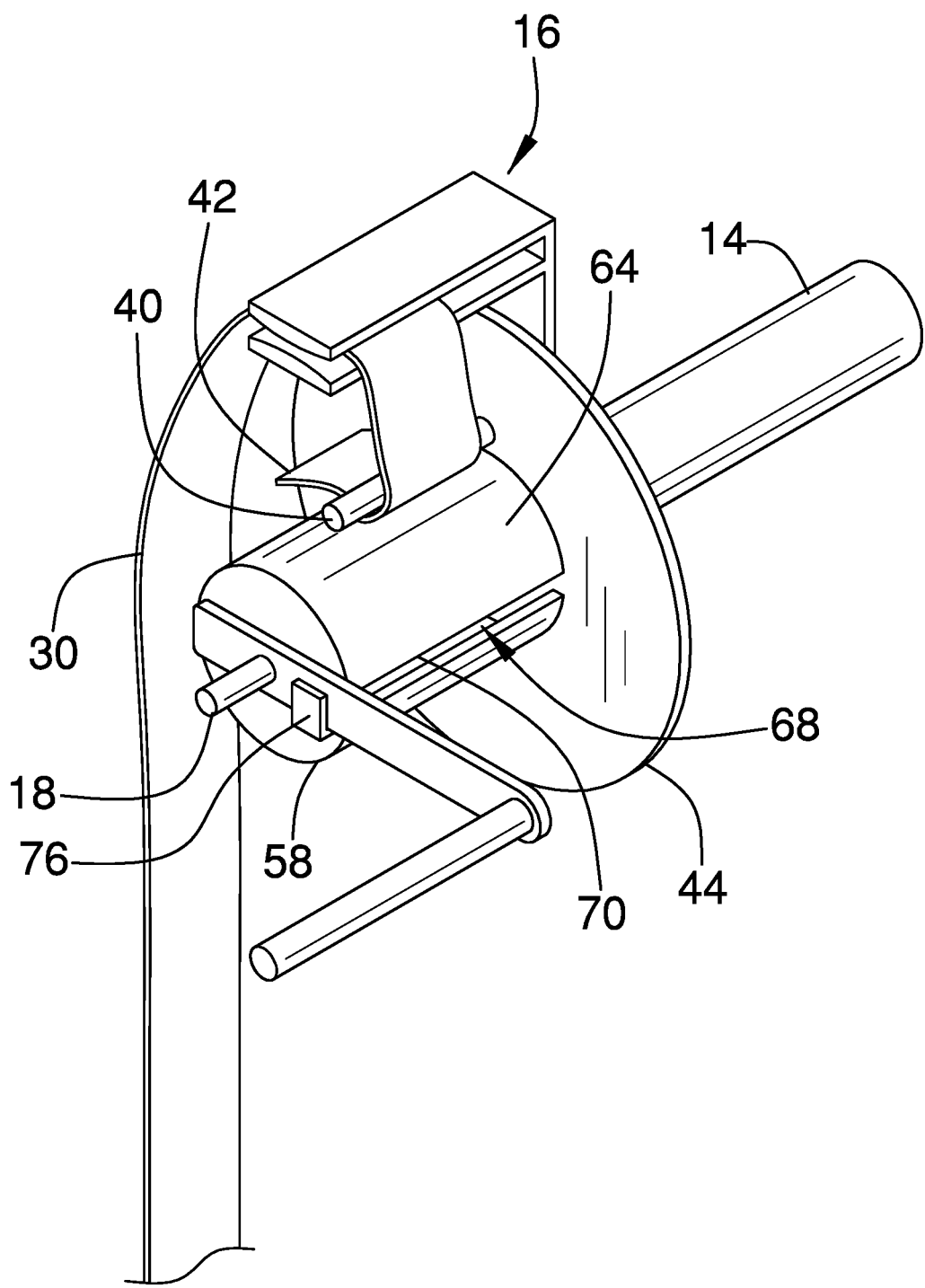
FIG. 4 is a perspective in-use view of an embodiment of the disclosure showing a cargo strap being extended through a guide and wrapped around a peg.
Figure 5:
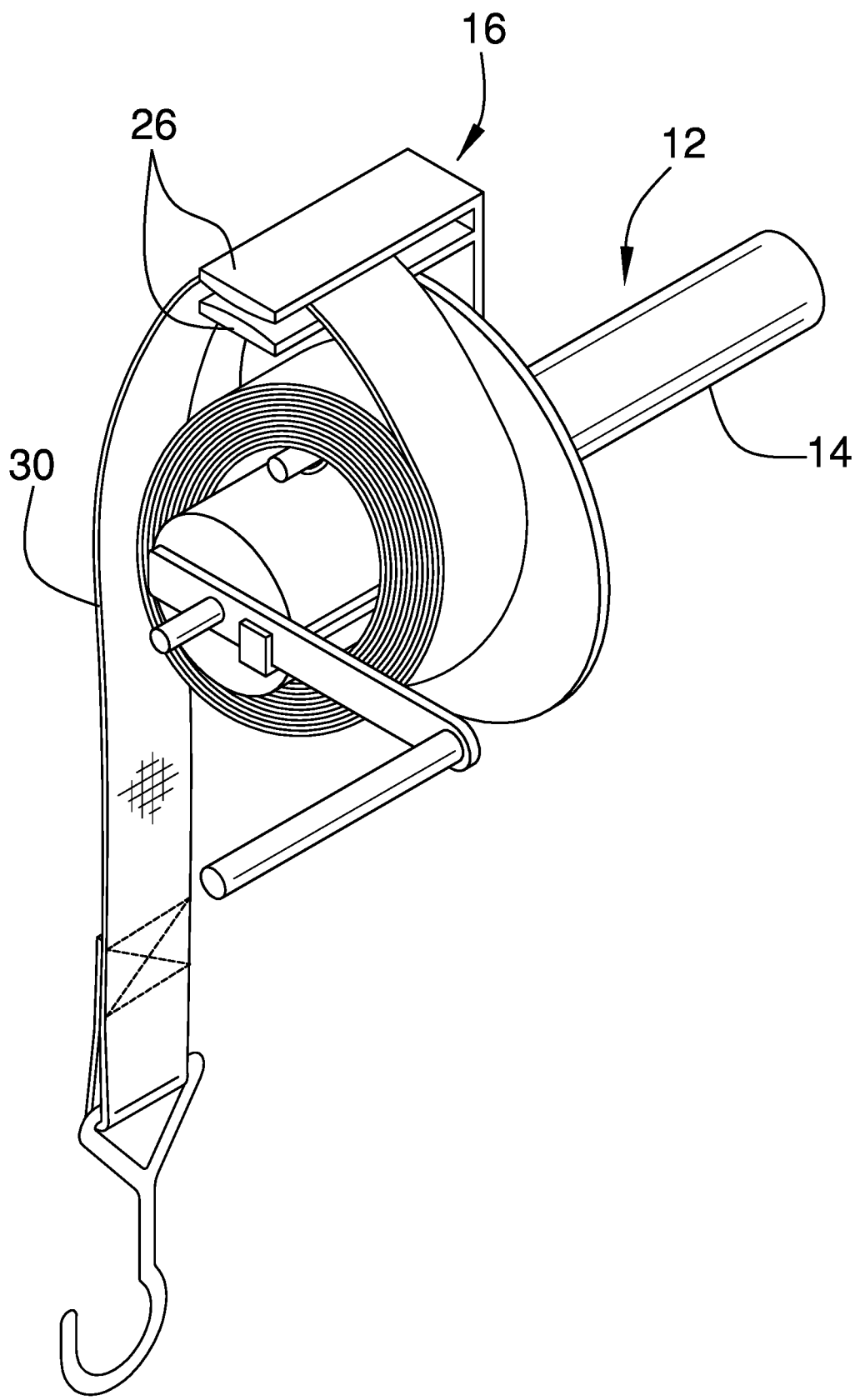
FIG. 5 is a perspective in-use view of an embodiment of the disclosure showing a cargo strap having been rolled up into a roll.
Figure 6:
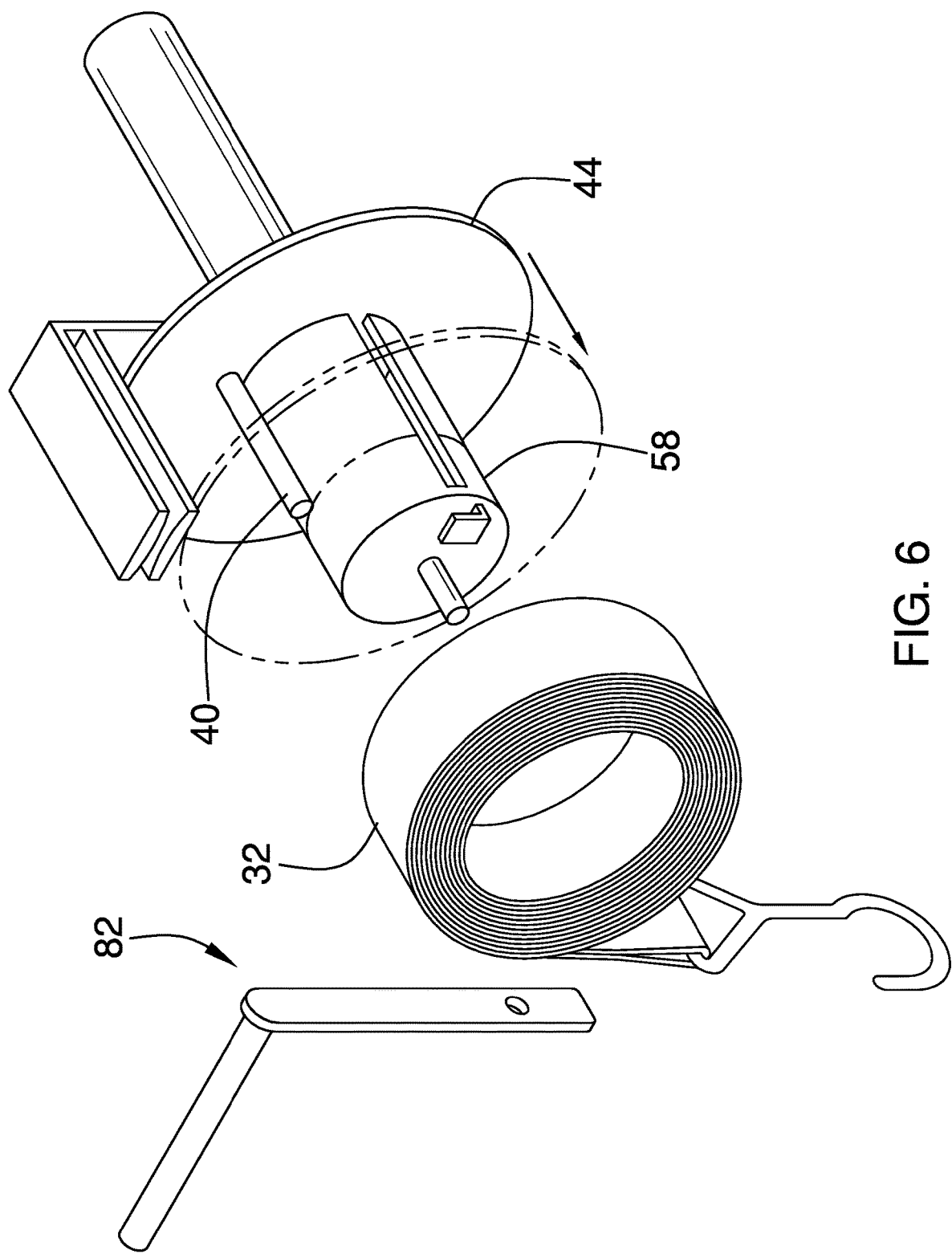
FIG. 6 is a perspective in-use view of an embodiment of the disclosure showing a second disk being slidable on a barrel for ejecting the cargo strap.

With reference now to the drawings, and in particular to FIGS. 1 through 6 thereof, a new rolling device embodying the principles and concepts of an embodiment of the disclosure and generally designated by the reference numeral 10 will be described.

As best illustrated in FIGS. 1 through 6, the cargo strap rolling assembly 10 generally comprises a grip 12 that includes a handle 14, a guide 16 and a shaft 18, and the handle 14 has a first end 20. The guide 16 has a first portion 22 that is coupled to and extends upwardly from the first end 20 and a second portion 24 that is oriented at an angle with respect to the first portion 22. The second portion 24 is oriented to extend along an axis is collinear with a longitudinal axis of the handle 14. Moreover, the second portion 24 comprises a pair of panels 26 that is spaced apart from each other to define a space 28 between the panels 26. In this way the guide 16 is structured to have a cargo strap 30 extended therethrough. Additionally, the shaft 18 is coupled to and extends away from the first end 60 of the handle 14 and the shaft 18 is oriented collinear with the longitudinal axis of the handle 14.

A first disk 32 is provided, the first disk 32 is slidable onto the shaft 18 and the first disk 32 has a front surface 34 and a perimeter edge 36. The first disk 32 has an aperture 38 extending therethrough for insertably receiving the shaft 18 and the aperture 38 is centrally positioned on the first disk 32. A peg 40 is coupled to the first disk 32 and an end 42 of the cargo strap 30 can be wrapped around the peg 40 when the cargo strap 30 is passed through the guide 16. In this way the peg 40 secures the end 42 of the cargo strap 30. The peg 40 extends away from the front surface 34 of the first disk 32 and the peg 40 is positioned adjacent to the perimeter edge 36 of the first disk 32. Moreover, the peg 40 is positioned beneath the guide 16 and is oriented collinear with the guide 16 when the first disk 32 is positioned on the shaft 18.

A second disk 44 is provided and the second disk 44 is slidable onto the shaft 18. The second disk 44 engages the peg 40 such that the first disk 32 is rotatably coupled to the second disk 44. Additionally, the second disk 44 has a diameter that is greater than the diameter of the first disk 32. The second disk 44 has a forward surface 46, a rear surface 48 and an outer edge 50. The second disk 44 has a hole 52 extending through the forward surface 46 and the rear surface 48, and the hole 52 is centrally positioned on the second disk 44.

The second disk 44 has a pair of slots 54 each extending through the forward surface 46 and the rear surface 48 and each of the slots 54 is curved to define a segment of an arc. Additionally, the pair of slots 54 is positioned to substantially surround the hole 52. The second disk 44 has a peg hole 56 extending through the forward surface 46 and the rear surface 48. The peg hole 56 is positioned between a respective one of the slots 54 and the outer edge 50 of the second disk 44. Moreover, the peg hole 56 insertably receives the peg 40 when the second disk 44 is slid onto the shaft 18.

A barrel 58 is slidable onto the shaft 18 and the barrel 58 releasably engages the second disk 44 such that the barrel 58 is rotatably coupled to the second disk 44. The barrel 58 has a first end 60, a second end 62 and an outer wall 64 extending therebetween. The second end 62 is open, the first end 60 is closed, the first end 60 has a shaft opening 66 extending therethrough for insertably receiving the shaft 18 and the shaft opening 66 is centrally positioned on the first end 60. Additionally, the outer wall 64 has a pair of channels 68 each extending from the second end 62 toward the first end 60. The channels 68 are positioned on opposite sides of the outer wall 64 with respect to each other and each of the channels 68 has a bounding edge 70. Each of the slots 54 in the second disk 44 insertably receives the second end 62 of the barrel 58. Moreover, a terminal end 72 of each of the slots 54 abuts the bounding edge 70 of the channels 68 such that second disk 44 rotates about the shaft 18 when the barrel 58 is rotated. In addition, the second disk 44 is slidable between the first end 60 and the second end 62 of the barrel 58.

A biasing member 74 is positioned in the barrel 58 and the biasing member 74 engages the second disk 44 to bias the second disk 44 against the first disk 32. Moreover, the second disk 44 is slidable away from the first disk 32. An engagement 76 is provided and the engagement 76 is coupled to the first end 60 of the barrel 58. The engagement 76 comprises a leg 78 extending away from the first end 60 and a foot 80 extending away from the leg 78. Additionally, the engagement 76 is positioned between the shaft opening 66 in the first end 60 of the barrel 58 and the outer wall 64 of said barrel 58.

A crank 82 is removably attachable to the barrel 58 for rotating the barrel 58 around the shaft 18. In this way the cargo strap 30 is wrapped around the barrel 58 to form a roll for storage. The crank 82 has a leg 84 and a rod 86 that is oriented at an angle with the leg 84. The leg 84 has a shaft hole 88 extending therethrough for insertably receiving the shaft 18 thereby facilitating the rod to be gripped for cranking the crank 82. Additionally, the leg engages the engagement 76 on the barrel 58 for rotating the barrel 58 when the crank 82 is cranked.

In use, the cargo strap 30 is extended through the guide 16 and the end of the cargo strap 30 is wrapped under the peg 40. The crank 82 is attached to the shaft 18, the handle 14 is gripped and the crank 82 is cranked such that the barrel 58 rotates about the shaft 18. In this way the cargo strap 30 is wrapped around the barrel 58 to form the cargo strap 30 in to a roll. The crank 82 is removed from the shaft 18 and the second disk 44 is urged to slide toward the first end 60 of the barrel 58. In this way the roll formed by the cargo strap 30 is removed from the barrel 58 for storing the cargo strap 30. Moreover, storing the cargo strap 30 in a roll is the preferred method of storing a cargo strap 30 in an organized, untangled and un-knotted manner.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cargo strap rolling assembly being configured to roll a cargo strap into a conveniently shaped roll for storage, said assembly comprising:
    a grip including a handle, a guide and a shaft;
    a first disk being slidable onto said shaft;
    a peg being coupled to said first disk, said peg having an end of the cargo strap wrapped therearound when the cargo strap is passed through said guide wherein said peg is configured to secure the end of the cargo strap;
    a second disk being slidable onto said shaft, said second disk engaging said peg such that said first disk is rotatably coupled to said second disk, said second disk having a diameter being greater than the diameter of said first disk;
    a barrel being slidable onto said shaft, said barrel releasably engaging said second disk such that said barrel is rotatably coupled to said second disk; and
    a crank being removably attachable to said barrel for rotating said barrel around said shaft wherein said barrel is configured to have the cargo strap wrapped therearound to form a roll for storage.

2. The assembly according to claim 1, wherein said handle has a first end, said guide having a first portion being coupled to and extending upwardly from said first end and a second portion oriented at an angle with respect to said first portion, said second portion being oriented to extend along an axis being collinear with a longitudinal axis of said handle.

3. The assembly according to claim 2, wherein said second portion comprises a pair of panels being spaced apart from each other to define a space between said panels wherein said space is configured to have a cargo strap being extended therethrough.

4. The assembly according to claim 2, wherein said shaft is coupled to and extends away from said first end of said handle having said shaft being oriented collinear with said longitudinal axis of said handle.

5. The assembly according to claim 4, wherein said first disk has a front surface and a perimeter edge, said first disk having an aperture extending therethrough for insertably receiving said shaft, said aperture being centrally positioned on said first disk.

6. The assembly according to claim 5, wherein said peg extends away from said front surface of said first disk, said peg being positioned adjacent to said perimeter edge of said first disk, said peg being positioned beneath said guide and being oriented collinear with said guide when said first disk is positioned on said shaft.

7. The assembly according to claim 1, wherein said second disk has a forward surface, a rear surface and an outer edge, said second disk having a hole extending through said forward surface and said rear surface, said hole being centrally positioned on said second disk.

8. The assembly according to claim 7, wherein said second disk has a pair of slots each extending through said forward surface and said rear surface, each of said slots being curved to define a segment of an arc, said pair of slots being positioned to substantially surround said hole.

9. The assembly according to claim 8, wherein said second disk has a peg hole extending through said forward surface and said rear surface, said peg hole being positioned between a respective one of said slots and said outer edge of said second disk, said peg hole insertably receiving said peg when said second disk is slid onto said shaft.

10. The assembly according to claim 8, wherein said barrel has a first end, a second end and an outer wall extending therebetween, said second end being open, said first end being closed, said first end having a shaft opening extending therethrough for insertably receiving said shaft, said shaft opening being centrally positioned on said first end.

11. The assembly according to claim 10, wherein said outer wall has a pair of channels each extending from said second end toward said first end, said channels being positioned on opposite sides of said outer wall with respect to each other, each of said channels having a bounding edge, each of said slots in said second disk insertably receiving said second end of said barrel, a terminal end of each of said slots abutting said bounding edge of said channels such that second disk rotates about said shaft when said barrel is rotated, said second disk being slidable on said barrel.

12. The assembly according to claim 11, further comprising a biasing member being positioned in said barrel, said biasing member engaging said second disk to bias said second disk against said first disk, said second disk being slidable away from said first disk.

13. The assembly according to claim 10, further comprising an engagement being coupled to said first end of said barrel, said engagement comprising a leg extending away from said first end and a foot extending away from said leg.

14. The assembly according to claim 13, wherein said crank has a leg and a rod being oriented at an angle with said leg, said leg having a shaft hole extending therethrough for insertably receiving said shaft thereby facilitating said rod to be gripped for cranking said crank, said leg engaging said engagement on said barrel for rotating said barrel when said crank is cranked.

15. A cargo strap rolling assembly being configured to roll a cargo strap into a conveniently shaped roll for storage, said assembly comprising:
 a grip including a handle, a guide and a shaft, said handle having a first end, said guide having a first portion being coupled to and extending upwardly from said first end and a second portion oriented at an angle with respect to said first portion, said second portion being oriented to extend along an axis being collinear with a longitudinal axis of said handle, said second portion comprising a pair of panels being spaced apart from each other to define a space between said panels wherein said space is configured to have a cargo strap being extended therethrough, said shaft being coupled to and extending away from said first end of said handle having said shaft being oriented collinear with said longitudinal axis of said handle;
 a first disk being slidable onto said shaft, said first disk having a front surface and a perimeter edge, said first disk having an aperture extending therethrough for insertably receiving said shaft, said aperture being centrally positioned on said first disk;
 a peg being coupled to said first disk, said peg having an end of the cargo strap wrapped therearound when the cargo strap is passed through said guide wherein said peg is configured to secure the end of the cargo strap, said peg extending away from said front surface of said first disk, said peg being positioned adjacent to said perimeter edge of said first disk, said peg being positioned beneath said guide and being oriented collinear with said guide when said first disk is positioned on said shaft;
 a second disk being slidable onto said shaft, said second disk engaging said peg such that said first disk is rotatably coupled to said second disk, said second disk having a diameter being greater than the diameter of said first disk, said second disk having a forward surface, a rear surface and an outer edge, said second disk having a hole extending through said forward surface and said rear surface, said hole being centrally positioned on said second disk, said second disk having a pair of slots each extending through said forward surface and said rear surface, each of said slots being curved to define a segment of an arc, said pair of slots being positioned to substantially surround said hole, said second disk having a peg hole extending through said forward surface and said rear surface, said peg hole being positioned between a respective one of said slots and said outer edge of said second disk, said peg hole insertably receiving said peg when said second disk is slid onto said shaft;
 a barrel being slidable onto said shaft, said barrel releasably engaging said second disk such that said barrel is rotatably coupled to said second disk, said barrel having a first end, a second end and an outer wall extending therebetween, said second end being open, said first end being closed, said first end having a shaft opening extending therethrough for insertably receiving said shaft, said shaft opening being centrally positioned on said first end, said outer wall having a pair of channels each extending from said second end toward said first end, said channels being positioned on opposite sides of said outer wall with respect to each other, each of said channels having a bounding edge, each of said slots in said second disk insertably receiving said second end of said barrel, a terminal end of each of said slots abutting said bounding edge of said channels such that second disk rotates about said shaft when said barrel is rotated, said second disk being slidable on said barrel;

a biasing member being positioned in said barrel, said biasing member engaging said second disk to bias said second disk against said first disk, said second disk being slidable away from said first disk;

an engagement being coupled to said first end of said barrel, said engagement comprising a leg extending away from said first end and a foot extending away from said leg; and a crank being removably attachable to said barrel for rotating said barrel around said shaft wherein said barrel is configured to have the cargo strap wrapped therearound to form a roll for storage, said crank having a leg and a rod being oriented at an angle with said leg, said leg having a shaft hole extending therethrough for insertably receiving said shaft thereby facilitating said rod to be gripped for cranking said crank, said leg engaging said engagement on said barrel for rotating said barrel when said crank is cranked.

* * * * *